(12) United States Patent
Zhao (10) Patent No.: US 10,057,190 B2
(45) Date of Patent: Aug. 21, 2018

(54) SERVICE ACCESS MANAGEMENT

(71) Applicant: International Business Machines Corporation, Armonk, NY (US)

(72) Inventor: Qin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 14/884,872

(22) Filed: Oct. 16, 2015

(65) Prior Publication Data

US 2017/0111292 A1 Apr. 20, 2017

(51) Int. Cl.
*H04L 12/911* (2013.01)

(52) U.S. Cl.
CPC .......... *H04L 47/826* (2013.01); *H04L 47/822* (2013.01)

(58) Field of Classification Search
CPC ............................ H04L 47/822; H04L 47/826
See application file for complete search history.

(56) References Cited

U.S. PATENT DOCUMENTS

| | | | | |
|---|---|---|---|---|
| 7,111,323 B1 * | 9/2006 | Bhatia | ................. | H04L 63/0815 707/999.009 |
| 7,650,497 B2 | 1/2010 | Thornton et al. | | |
| 8,682,802 B1 * | 3/2014 | Kannanari | ......... | G06Q 20/3274 705/64 |
| 8,683,196 B2 * | 3/2014 | Fu | ...................... | H04L 63/0823 705/44 |
| 8,738,901 B2 | 5/2014 | Fu et al. | | |
| 2008/0313727 A1 * | 12/2008 | Chen | ....................... | G06F 21/31 726/9 |
| 2011/0113239 A1 | 5/2011 | Fu et al. | | |
| 2011/0167256 A1 * | 7/2011 | Lee | .......................... | H04L 63/20 713/156 |
| 2012/0079572 A1 * | 3/2012 | Tsai | ....................... | G06F 21/33 726/6 |
| 2012/0110318 A1 | 5/2012 | Stone | | |
| 2012/0159140 A1 | 6/2012 | Chang et al. | | |
| 2012/0210123 A1 | 8/2012 | Castelnuovo et al. | | |
| 2013/0227662 A1 * | 8/2013 | Crampton | ........... | G06F 21/6209 726/6 |
| 2014/0150080 A1 * | 5/2014 | Miller | ..................... | G06F 21/10 726/9 |
| 2014/0250297 A1 | 9/2014 | Fu et al. | | |
| 2015/0067328 A1 * | 3/2015 | Yin | ..................... | H04L 63/0807 713/168 |
| 2015/0172271 A1 * | 6/2015 | Barrows | ................. | H04L 63/08 726/9 |
| 2015/0177271 A1 * | 6/2015 | Kim | ...................... | G01P 15/105 505/162 |

OTHER PUBLICATIONS

Renew a Certificate, Applies to: Windows 7, Windows Server 2008 R2, 1 page.

* cited by examiner

*Primary Examiner* — Abdullahi E Salad (74) *Attorney, Agent, or Firm* — Schmeiser, Olsen & Watts, LLP; Isaac Gooshaw (57) ABSTRACT

A method and associated system. An expiration time instant of a token for accessing a service is determined. Accessibility of the service based on the expiration time instant of the token is determined. In response to determining that the service is inaccessible, a deferred expiration time instant of the token is determined based on access information about the service.

17 Claims, 4 Drawing Sheets

SERVICE ACCESS MANAGEMENT

TECHNICAL FIELD

The present invention relates to management of tokens used for accessing services.

BACKGROUND

A network system generally controls large pools of computing, storage, and networking resources. By means of the preceding resources, the network system is capable of providing a plurality of services including, but not limited to, computing services, image services, storage services, network services and the like. The network system may manage access to the services by means of token authentication. That is, before a user can access a service, the user requests a token from the network system. Upon receipt of the request, the network system may assign a token with an expiration time instant to the user. Then the user may send a request, together with the token, for accessing the service.

Generally, the network system may determine the validity of the token based on the expiration time instant of the token. The expiration time instant indicates a lifetime of the token. If the time instant at which the request is received is later than the expiration time instant, the network system determines that the token is invalid or expired. Otherwise, the network system determines that the token is valid or unexpired. Thus, upon receipt of a request for accessing a service, the network system verifies the token and allows the user to access the requested service if the token is valid. However, in some cases, the token may become invalid when the network system begins to verify the token. The network system thus would not allow the user to access the requested service due to the invalid token, even if the request is legitimate.

SUMMARY

A method and associated computer system and associated computer program product. An expiration time instant of a token for accessing a service is determined by one or more processors of a computer system. Accessibility of the service is determined by the one or more processors based on the expiration time instant of the token. In response to determining that the service is inaccessible, the one or more processors determine a deferred expiration time instant of the token based on access information about the service.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar element.

DETAILED DESCRIPTION

Some embodiments will be described in more detail with reference to the accompanying drawings, in which the embodiments of the present invention have been illustrated. However, the present invention can be implemented in various manners, and thus should not be construed to be limited to the embodiments disclosed herein. To the contrary, those embodiments are provided for a thorough and complete understanding of the present invention, and completely conveying the scope of the present invention to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud model of the present invention may include at least five characteristics, at least three service models, and at least four deployment models.

Characteristics of the cloud model are as follows.

A characteristic of the cloud model, denoted as on-demand self-service, is: a cloud consumer can unilaterally provision computing capabilities, such as server time and network storage, as needed automatically without requiring human interaction with the service's provider.

A characteristic of the cloud model, denoted as broad network access, is: capabilities are available over a network and accessed through standard mechanisms that promote use by heterogeneous thin or thick client platforms (e.g., mobile phones, laptops, and PDAs).

A characteristic of the cloud model, denoted as resource pooling, is: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify a location at a higher level of abstraction (e.g., country, state, or datacenter).

A characteristic of the cloud model, denoted as rapid elasticity, is: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

A characteristic of the cloud model, denoted as measured service, is: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models of the cloud model are as follows.

A service model of the cloud model, denoted as Software as a Service (SaaS), is: the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

A service model of the cloud model, denoted as Platform as a Service (PaaS), is: the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

A service model of the cloud model, denoted as Infrastructure as a Service (IaaS), is: the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models of the cloud model are as follows.

A deployment model of the cloud model, denoted as Private cloud, is: the cloud infrastructure is operated solely for an organization. The cloud infrastructure may be managed by the organization or a third party and may exist on-premises or off-premises.

A deployment model of the cloud model, denoted as Community cloud, is: the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises.

A deployment model of the cloud model, denoted as Public cloud, is: the cloud infrastructure is made available to the general public or a large industry group and is owned by an organization selling cloud services.

A deployment model of the cloud model, denoted as Hybrid cloud, is: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
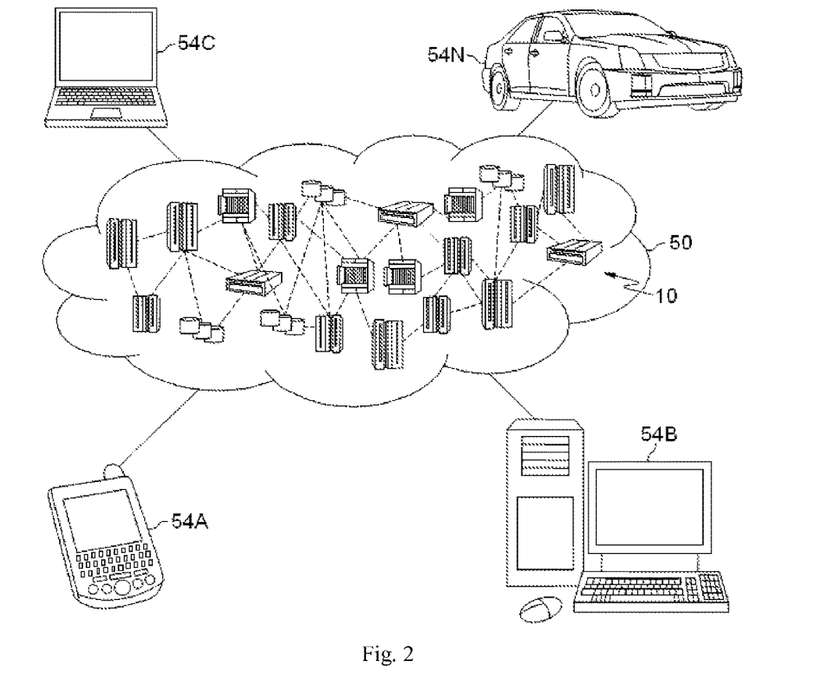
FIG. 2 depicts a cloud computing environment according to embodiments of the present invention.

Referring now to FIG. 2, a schematic of an example of one or more cloud computing nodes 10 is shown according to embodiments of the present invention. A cloud computing node 10 is only one example of a suitable cloud computing node and is not intended to suggest any limitation as to the scope of use or functionality of embodiments of the invention described herein. Regardless, a cloud computing node 10 is capable of being implemented and/or performing any of the functionality set forth hereinabove.

Figure 1:
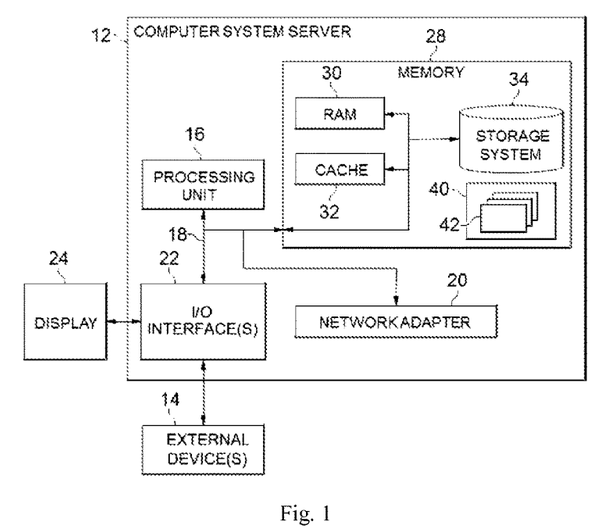
FIG. 1 depicts a cloud computing node according to embodiments of the present invention.

In cloud computing nodes 10, there is a computer system/server 12, as depicted in FIG. 1 according to embodiments of the present invention, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 of FIG. 2 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 2 depicts an illustrative cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. The nodes 10 may be grouped (not shown) physically or virtually, in one or more networks, such as Private, Community, Public, or Hybrid clouds as described hereinabove, or a combination thereof, which allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
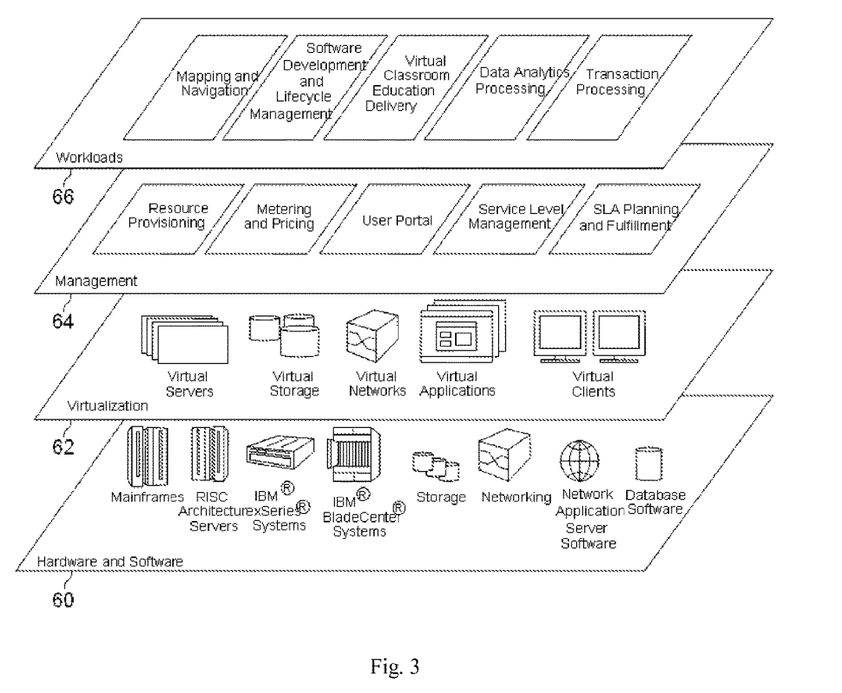
FIG. 3 depicts abstraction model layers according to embodiments of the present invention.

Referring now to FIG. 3, a set of functional abstraction layers provided by cloud computing environment 50 (FIG. 2) is shown according to embodiments of the present invention. It should be understood that the components, layers, and functions shown in FIG. 3 are intended to be illustrative only and embodiments of the present invention are not limited thereto. As depicted, the following layers and corresponding functions are provided.

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; and networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and so on.

Figure 4:
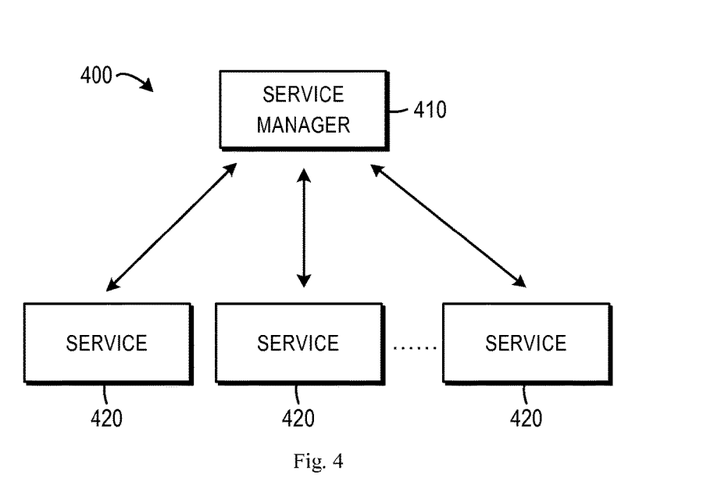
FIG. 4 is a schematic diagram of a network system in which embodiments of the present invention can be implemented.

Embodiments of the present invention may be implemented in a network system. FIG. 4 shows a schematic diagram of a network system 400 in which embodiments of the present invention can be implemented. The network system 400 may be implemented as a part of a network environment, such as the cloud computing environment 50. Although embodiments of the present invention are sometimes discussed hereafter with reference to the cloud computing environment 50, they are described only for the purpose of illustration to help those skilled in the art to understand the present invention, without suggesting any limitations as to the scope of the invention. It would be appreciated that the network system 400 may be implemented in any other suitable network environment.

In some embodiments, the network system 400 may be a distributed system including a service manager 410 and one or more services 420. In the shown example, the services 420 may be normal services provided by the network system 400, such as a computing service, an image service, a storage service, a network service, and the like. The services 420 may be provided by one or more service providers; for example, the cloud computing nodes 10. The service manager 410 may be a specific service that is capable of providing central management of access to the services 420. In some embodiments, the service manager 410 may be implemented as a cloud computing node 10 or a computer system/server 12.

Conventionally, before a user accesses a service 420, the user requests a token from the service manager 410 for accessing the service. For the sake of discussion, such a request for a token is referred to as the "token request." In response to receipt of the token request, the service manager 410 may generate and send to the user a token with a predetermined expiration time instant. Then the user may send a request for accessing a service 420 together with the token to the network system 400. For the sake of discussion, such a request for accessing the service 420 is referred to as the "service access request." The service manager 410 determines whether to accept or deny the service access request at least in part based on the validity of the token. If the predetermined expiration time instant defines a very short lifetime for the token, or if the service access request is delayed, for example, due to network transmission congestion, the service manger 410 may find that the token has expired in response to receiving the service access request. Then the service manager 410 may inform the service 420 to deny the service access request. As such, the user who has been authenticated to access the service 420 cannot complete the access due to the undesired expiration of the token. To deal with this situation, conventional approaches generate tokens with quite long lifetimes. Although this allows the user to successfully access the service 420, the security of the network system 400 will be degraded.

In accordance with embodiments of the present invention, instead of directly lengthening the lifetime of tokens from the very beginning, the expiration time instant of the token may be deferred based on access information about the service which indicates execution duration of the service. In this way, the lifetime of the token may be lengthened more appropriately and dynamically. As such, it is possible to avoid unsuccessful access to the service 420 while maintaining the security of the network system 400 at a high level.

Figure 5:
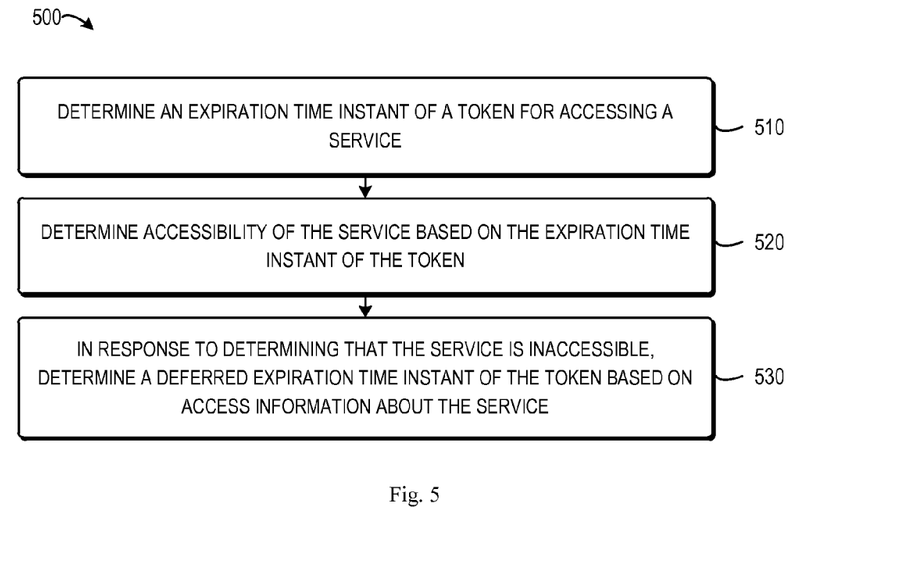
FIG. 5 is a flow chart of a method for managing service access in accordance with embodiments of the present invention.

Now some example embodiments of the present invention will be described. FIG. 5 shows a flow chart of a method 500 for managing access to a service in accordance with embodiments of the present invention. The method 500 may be implemented at the service manager 410. The service manager 410 may increase the possibility of successful access to a service 420 by applying the method 500.

The method 500 is entered in step 510, where an expiration time instant of a token for accessing a service is determined. As used herein, a service 420 may be a cloud service or other suitable service provided by the network system 400. Although some embodiments are discussed with reference to the cloud service hereafter, they are described only for the purpose of illustration to help those skilled in the art to understand the present invention, without suggesting any limitations as to the scope of the invention. Those skilled in the art would readily understand that the service may be implemented as any other suitable service that can be provided by the network system 400.

As discussed above, when a user wants to access a service 420, the user sends to the service 420 a service access request including a token. In response, the service 420 may send an identification of the token, for example, via a message, to the service manager 410 to verify the token. The message may have any suitable form, as long as the message can carry the identification of the token. The identification may be assigned to the token by the service manager 410, for example, as a part of the initialization information about the token.

Similar to the identification of the token, the expiration time instant of the token may be also generated by the service manager 410 and included in the initialization information. This expiration time instant is a time instant that is later than the generation time instant of the token by a predefined time period. For the sake of discussion, such expiration time instant may be sometimes referred to as the "initial expiration time instant." The predefined time period may have a fixed value, a random value, a periodically-changing value, or the like. It is to be understood that in addition to or instead of the identification of the token and the initial expiration time instant, the initialization information may include other content.

In some embodiments, the initialization information is stored on a computer readable storage medium that is accessible to the service manager 410. For example, the initialization information may be stored in a database, a file, or the like. In response to receipt of the identification of the token, which is for example carried by a message as discussed above, the service manager 410 may obtain the initialization information of the token based on the identification of the token, and extract the expiration time instant of the token from the initialization information.

Next, in step 520, accessibility of the service is determined based on the expiration time instant of the token. The accessibility of a service indicates whether the service is accessible. With the expiration time instant of the token, the service manager 410 may determine the accessibility of the service 420 in a variety of ways. In some embodiments, the service manager 410 may determine the time instant at which the message is received, which is referred to as the "receiving time instant" for the sake of discussion. In such embodiments, the service manager 410 compares the receiving time instant with the expiration time instant of the token. If the receiving time instant is not later than the expiration time instant of the token, the service manager 410 may determine that the token is still valid and the service is thus accessible. Otherwise, if the receiving time instant is later than the expiration time instant of the token, the service manager 410 may determine that the service is inaccessible since the token has become invalid.

Alternatively, or in addition, in some embodiments, the accessibility of the service 420 is related to the accessibility of subservice(s) of the service 420. If any of the subservice(s) is inaccessible, the service 420 may be determined as being inaccessible. According to embodiments of the present invention, an operation provided by a subservice may be a sub-operation of an operation provided by the service 420. In an example, it is supposed that a service 420 is a computing service that provides an operation involving three sub-operations which are provided by an image service, the computing service and a network service, respectively. In this case, the image service, the computing service itself and the network service are the subservices of the service 420. It is to be understood that a subservice itself may be a normal service. That is, the user can directly request to access a subservice.

Still in reference to step 520, in some embodiments, the service manager 410 may determine whether the service 420 has a subservice based on access information about the service 420. If the service 420 has a subservice, the service manager 410 may determine a time instant at which the subservice is expected to start. This time instant at which the subservice is expected to start is referred to as the "starting time instant" for the sake of discussion. Then the service manager 410 compares the staring time instant with the expiration time instant of the token. If the staring time instant is no later than the expiration time instant of the token, the service manager 410 determines that the subservice is accessible and may proceed with determining accessibility of other subservices, if any. However, if the starting time instant is later than the expiration time instant of the token, the service manager 410 may determine that the subservice and thus the requested service are inaccessible.\

According to embodiments of the present invention, the access information comprises information about accesses to service 420 and/or its subservice(s). In some embodiments, the access information may be predefined by a user, an operator of the network system 400, or other suitable persons skilled in the art. Alternatively, or in addition, the access information may be generated, for example, by the service manager 410, periodically or at a predetermined time instant. Alternatively, or in addition, the access information may be determined based on system logs or other suitable records that are regularly generated in the network system 400.

The access information of a service may indicate execution duration of the service that represents a time period for executing the service. In addition, or alternatively, the access information of a service may indicate an execution duration of a subservice of the service. In this case, even if the execution duration of the service is not indicated explicitly by the access information, the execution duration of the service can be calculated based on execution durations of subservices of the service in several ways. In some embodiments, the execution duration of the service may be determined by calculating a sum of the execution durations of the subservices. Alternatively, the execution duration of the service may be determined by calculating an average or a maximum of the execution durations of the subservices and multiplying the average or the maximum of the execution durations by the number of the subservices.

It would be appreciated that the access information may include other appropriate information such as an execution order of a subservice, which indicates the position of one subservice in an execution sequence of all subservices of the service. In an example, it is supposed that a service which is referred to as "computing service" has three subservices, namely, an image service, a computing service and a network service, and the execution sequence of the three subservices is "image service->computing service->network service." In this case, it can be determined that the execution order of the "image service" is 1, the execution order of the "computing service" is 2, and the execution order of the "network service" is 3.

In some embodiments, the access information may comprise historical access information which contains information about access history of one or more services. The historical access information may be generated by the service manager 410 or other suitable cloud computing node 10 in background, either periodically or at a predetermined time instant, in operations. As discussed above, the historical access information can be generated by the network system 400 directly, or may be obtained by extracting appropriate information from logs that are conventionally generated in the network system 400. Although some embodiments are discussed with reference to the historical access information hereafter, such embodiments are described only for the purpose of illustration to help those skilled in the art to understand the present invention, without suggesting any limitations as to the scope of the present invention. Those skilled in the art would readily understand that the access information may be implemented in any suitable forms and determined based on any suitable sources.

In step 530, if it is determined that the service is inaccessible, a deferred expiration time instant of the token is determined based on access information about the service. The deferred expiration time instant is a time instant later than the initialized expiration time instant for a certain time period. The certain time period may be determined in a variety of ways. If the deferred expiration time instant of the token does not exist, the service manager 410 may determine the deferred expiration time instant of the token based on the access information. Alternatively, if the service 420 is determined as being inaccessible due to a subservice of the service 20, the service manager 410 may determine the deferred expiration time instant of the token based on the starting time instant of the subservice. In this way, the possibility of successful access to the service 420 can be effectively increased. The user experience can be improved accordingly.

Optionally, in order to guarantee security of the network system 400, in the method 500, the service manager 410 may determine the validity of the deferred expiration time instant, for example, periodically or at a predetermined time point. Such determination of validity of the deferred expiration time instant may be performed in background. If the deferred expiration time instant is invalid, the deferred expiration time instant can be considered as being obsolete and no longer suitable for use. Thus, the service manager 410 may discard the deferred expiration time instant, such that the deferred expiration time instant no longer exists. In accordance with embodiments of the present invention, the validity of deferred expiration time instant may be determined according to a plurality of policies.

In some embodiments, if an identification of a token included in the service access request is different from an identification of a token corresponding to the deferred expiration time instant, it may be determined that the deferred expiration time instant is invalid. Alternatively, or in addition, in some embodiments, if the current time instant is later than the deferred expiration time instant, it may be determined that the deferred expiration time instant is invalid. Alternatively, or in addition, in some embodiments, if a number of times for which the deferred expiration time instant has been generated for a subservice of the service (for sake of discussion, it is also referred to as a "generating count" hereafter) mismatches an execution order of the subservice, it may be also determined that the deferred expiration time instant is invalid. For example, if the deferred expiration time instant has been generated for a subservice for 3 times (that is, the generating count is 3), but execution order of the subservice is 2 (that is, the subservice is the second subservice invoked by the service), the deferred expiration time instant may be determined as being invalid since the generating count 3 is larger than the execution order 2. In this way, if the deferred expiration time instant is invalid, the deferred expiration time instant will not be used in management of service access. As such, potential security risks can be avoided. The policies for determining the validity of deferred expiration time instant will be described in further detail with respect to FIGS. 6 and 7.

It is to be understood that the above is described only for the purpose of illustration to help those skilled in the art to understand the present invention, without suggesting any limitations as to the scope of the invention. It would be appreciated that the validity of the deferred expiration time instant may be determined by any other suitable service in the network system 400.

Figure 6:
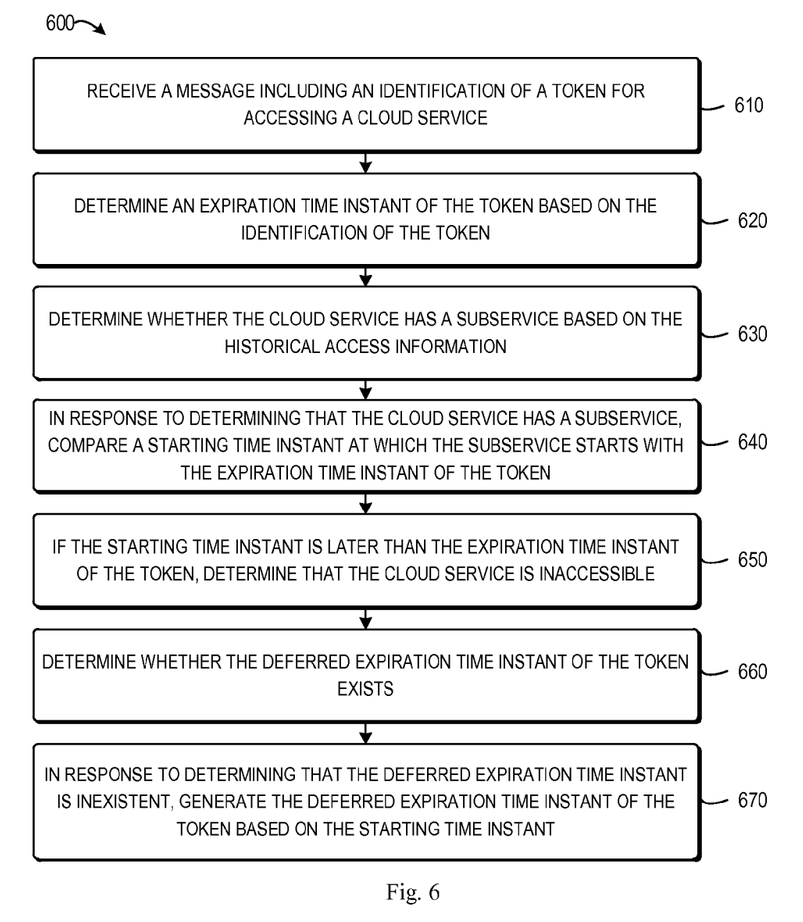
FIG. 6 is a flow chart of a method for managing service access in accordance with further embodiments of the present invention.

Now some example embodiments of determination of the deferred expiration time instant will be described. FIG. 6 is a flow chart of a method 600 for managing service access in accordance with embodiments of the present invention. The method 600 can be considered as an implementation of the method 500. It is to be understood that the method 500 may be implemented in several ways as discussed above, and the method 600 is only one example instead of limitation.

The method 600 is entered in step 610, where a message including an identification of a token for accessing a cloud service is received. In step 620, an expiration time instant of the token is determined based on the identification of the token. The message receipt in step 610 and the determination of the expiration time instant in step 620 are similar to those discussed in step 510 and will not be detailed again herein.

For the sake of discussions, an example will be discussed with reference to FIG. 7, which illustrates a schematic diagram of a graphical representation of service access management in a cloud system 700 in accordance with embodiments of the present invention. The cloud system 700 may be an embodiment of the network system 400. In some embodiments, the cloud system 700 may be implemented as at least a part of the cloud computing environment 50.

Figure 7:
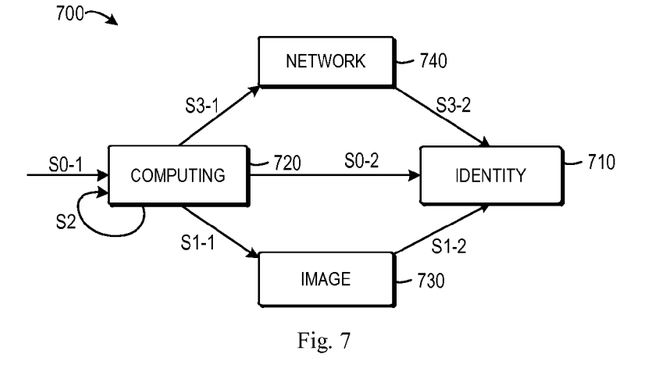
FIG. 7 is a schematic diagram of a graphical representation of service access management in a network system in accordance with embodiments of the present invention.

In the example shown in FIG. 7, the cloud system 700 includes four cloud services, namely, an identity service 710, a computing service 720, an image service 730, and a network service 740. The identity service 710 may act as the service manager 410 that provides central management of access to the cloud services 720 to 740. The computing service 720 provides an operation named "create_instance", which involves three sub-operations, namely, "download_image," "boot_vm," and "attach_port." Since the three sub-operations are provided by the three cloud services of the image service 730, the computing service 720 and the network service 740, respectively, these three cloud services are subservices of the computing service 720.

In the shown example, if a user wants to access the computing service 420, the user may request for a token from the identity service 710 with the user's credential in advance. The identity service 710, in response to receipt of the token request, may generate a token and assign the token to the user. By way of example, a token may be denoted as a record TOK(token_id, expiration_timestamp), wherein "token_id" represents an identification of the token, and "expiration_timestamp" represents an expiration time instant of the token. Different records TOK(token_id, expiration_timestamp) will be generated for different tokens. Thus, a table or a database may be used to record these tokens, so that they can be looked up conveniently. In the shown example, the token assigned to the user may be denoted as TOK (abc, 9:30), which indicates that the identification of the token is "abc" and the expiration time instant of the token is "9:30."

Then the user may send a service access request including the identification of the token to the computing service 720 for creating an instance. According to embodiments of the present invention, the service access request may be denoted as REQ(request_id, service_name, request_type, token_id, timestamp), wherein "request_id" represents an identification of the service access request, "service_name" identifies a cloud service which is requested by the user, "request_type" represents an operation which is requested to be provided by the cloud service, "token_id" represents the identification of the token, and "timestamp" represents a time instant at which the service access request is sent.

In the shown example, the service access request sent (S0-1) by the user may be denoted as REQ(123, compute, create_instance, abc, 9:00). In response to receipt of the service access request, the computing service 720 determines that the user wants an operation "create_instance" to be provided by the computing service 720, the token included in the service access request has an identification of "abc" and the service access request is initiated at 9:00. Then, the computing service 720 may determine whether the user is allowed to access the computing service 720. To this end, the computing service 720 may send (S0-2) a message including the identification of the token to the identity service 710. In this case, the identity service 710 may perform steps 610 and 620 as discussed above.

Still in reference to FIG. 6, in step 630, whether the cloud service has a subservice is determined based on the historical access information. If a subservice is inaccessible, the cloud service may be determined as being inaccessible. The historical access information may include information about access history of the cloud service. In some embodiments, the historical access information (referred to as "estimated request duration (ERD)") may be denoted as:

ERD(service_name, request_type, sub_service_name, sub_request_type, sequence, duration), where "service_name" represents a cloud service which is requested by the user, "request_type" represents an operation which is requested to be provided by the cloud service, "sub_service_name" represents a subservice of the cloud service, "sub_request_type" represents a sub-operation provided by the subservice for implementing the operation of the cloud service, "sequence" represents an execution order of the subservice, and "duration" represents an execution duration for the subservice to provide the sub-operation.

In the example shown in FIG. 7, it is supposed that the historical access information is denoted as:

ERD((compute, create_instance, image, download_image, 1, 20),
(compute, create_instance, compute, boot_vm, 2, 20),
(compute, create_instance, network, attach_port, 3, 10)).

From the above historical access information, identity service 710 may determine that the computing service 720 has three subservices, that is, the image service 730, the computing service 720 and the network service 740.

Still in reference to FIG. 6, in step 640, in response to determining that the cloud service has a subservice, a starting time instant at which the subservice starts is compared with the expiration time instant of the token. In some embodiments, the starting time instant of the subservice may be determined based on the historical access information.

In the example shown in FIG. 7, since the "sequence" and "duration" associated with the image service 730 is "1" and "20" respectively, it may be determined that the image service 730 is the first subservice invoked by the computing service 720 and the execution duration of the image service 730 is 20 minutes. Likewise, it may be determined that the computing service 720 and the network service 740 are the second and third subservices of the computing service 720, and their execution durations are 20 minutes and 10 minutes respectively. As such, it may be determined that the image service 730 starts to be invoked at 9:00, the computing service 720 starts to be invoked at 20 minutes after 9:00, that is, 9:20, and the network service 740 starts to be invoked at 40 minutes after 9:00, that is, 9:40. Accordingly, the starting time instants of the subservices of the computing service 720 are 9:00, 9:20 and 9:40, respectively.

Referring back to FIG. 6, in step 650, if the starting time instant is later than the expiration time instant of the token, the cloud service is determined as being inaccessible. In the example shown in FIG. 7, the starting time instant of the first subservice (the image service 730) is 9:00. Since the expiration time instant of the token is 9:30, the identity service 710 may determine that the image service 730 is accessible. With regard to the second subservice (the computing service 720), since the starting time instant is 9:20 which is earlier than 9:30, the identity service 710 may determine that the second subservice is accessible as well. However, since the starting time instant of the third subservice (the network service 740) 9:40 which is later than 9:30, the identity service 710 may determine that the network service 740 is inaccessible.

It is to be noted that the above example described only for the purpose of illustration to help those skilled in the art to understand the present invention, without suggesting any limitations as to the scope of the invention. It would be appreciated that since the computing service 720 is the second subservice of itself, the identity service 710 may directly determine that the second subservice is accessible, without comparing the starting time instant of the second subservice with the expiration time instant of the token.

preference and/or other factors, without suggesting any limitations as to the scope of the invention.

In some embodiments, a record (named "ETE") may be generated for the deferred expiration time instant as follows:
ETE(request_id, service_name, count, token_id, expiration_timestamp), where "request_id" represents an identification of the service access request,
"service_name" represents a cloud service which is requested by the user, "count" represents the number of times that the deferred expiration time instant has been generated, "token_id" represents the identification of the token, and "expiration_timestamp" represents the deferred expiration time instant.

In the example shown in FIG. 7, the deferred expiration time instant generated by the identity service 710 may be:
ETE(123, network, 0, abc, 9:45).

In this way, the computing service 720 may invoke its subservices successfully. More specifically, when the computing service 720 invokes (S1-1) the image service 730, the image service 730 may send (S1-2) a message to the identity service 710 to verify the token. Since the staring time instant of this message is 9:00 which is earlier than the expiration time instant of the token, the identity service 710 may inform the image service 730 the token is valid. When the computing service 720 invokes (S2) itself, the computing service 720 may not ask the identity service 710 to verify the token, but consider the token as being valid directly. When computing service 720 invokes (S3-1) the network service 740, the network service 740 may send (S3-2) a message to the identity service 710 to verify the token. Since the staring time instant of this message is 9:40 which is later than the expiration time instant but is earlier than the deferred expiration time instant, the identity service 710 may reply the network service 730 that the token is still valid.

In some embodiments, the process performed at the identity service 710 may be implemented according to pseudo codes shown in Table 1.

TABLE 1

```
for (name, sequence) in (ERD.sub_service_name, max(ERD.sequence)) \
    where (ERD.service_name == REQ.service_name and
        ERD.request_type == REQ.request_type):
    expiration = REQ.timestamp + sum(ERD.duration where (ERD.service_name ==
REQ.service_name and ERD.request_type == REQ.request_type and 0<
ERD.sequence <= sequence)
    insert into ETE values(ETE.request_id = REQ.request_id,
        ETE.service_name = name,
        ETE.count = 0,
        ETE.token_id = REQ.token_id
        ETE.expiration_timestamp = max(TOK.expiration_timestamp where
TOK.token_id == REQ.token_id, expiration)
```

The method 600 then proceeds to step 660, where it is determined whether the deferred expiration time instant of the token exists. In step 670, in response to determining that the deferred expiration time instant does not exist, the deferred expiration time instant of the token is generated based on the starting time instant. In the example shown in FIG. 7, it is supposed that the deferred expiration time instant of the token does not exist. Thus, the identity service 710 may generate a deferred expiration time instant. More specifically, with regard to the third subservice which is inaccessible, the identity service 710 may postpone the expiration time instant of the token as a deferred expiration time instant after 9:40. For instance, the deferred expiration time instant may be determined as 9:45, with a margin, e.g., of 5 minutes. It is to be noted that the margin may be predetermined according to system requirements, user's Additionally, in some embodiments, in order to guarantee security of the cloud system, the validity of deferred expiration time instant may be determined. In the example shown in FIG. 7, the identity service 710 may determine that the deferred expiration time instant is invalid if at least one of the following conditions is met:
1. REQ.request_id is in ETE, but REQ.token_id is different;
2. ETE.count >=max(ERD.sequence),
   where ETE.service_name==ERD.sub_service_name; and
3. Current time >=ETE.expiration_timestamp.

If the deferred expiration time instant is invalid, the deferred expiration time instant is considered as being obsolete and will not be used in management of service access any more. In this way, potential risks associated with a very long duration token can be avoided, and the security of the cloud system 700 can be improved.

It is to be noted that the above conditions are described only for the purpose of illustration to help those skilled in the art to understand the present invention, without suggesting any limitations as to the scope of the invention. It would be appreciated that the validity of the deferred expiration time instant may be determined in other suitable forms.

The method 500 and/or 600 may be implemented by computer programs. For example, the computer programs, when executed by a processor on a device (such as the computer system server 12 shown in FIG. 1, a computing node of the cloud computing nodes 10 shown in FIG. 2 or the service manager 410 shown in FIG. 4), may be loaded into the memory and cause the device to implement the method 500 and/or 600.

The present invention may be a method, a device, an apparatus, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an EPROM or Flash memory, a SRAM, a portable CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored on a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by one or more processors of a computer system, an expiration time instant of a token for accessing a service;
   said one or more processors determining accessibility of the service based on the expiration time instant of the token, wherein determining accessibility of the service comprises:
      determining whether the service has a subservice based on the access information;
      in response to determining that the service has a subservice, comparing a starting time instant at which the subservice starts with the expiration time instant of the token; a
      in response to determining that the starting time instant is later than the expiration time instant of the token, determining that the service is inaccessible; and
   in response to determining that the service is inaccessible, said one or more processors determining a deferred expiration time instant of the token based on access information about the service.

2. The method of claim 1, wherein determining a deferred expiration time instant of the token comprises:
   determining whether the deferred expiration time instant of the token exists; and
   in response to determining that the deferred expiration time instant does not exist, generating the deferred expiration time instant of the token based on the access information.

3. The method of claim 1, wherein determining a deferred expiration time instant of the token comprises: determining whether the deferred expiration time instant of the token exists; and in response to determining that the deferred expiration time instant does not exist, generating the deferred expiration time instant of the token based on the starting time instant.

4. The method of claim 1, wherein the access information is historical access information about the service.

5. The method of claim 1, wherein the access information indicates:
   an execution duration of the service; and/or
   an execution duration of a subservice of the service.

6. The method of claim 5, wherein the service has subservices, and wherein the access information further indicates a position of one subservice of the subservices in an execution sequence of all of the subservices.

7. The method of claim 1, further comprising:
   said one or more processors determining a validity of the deferred expiration time instant; and
   in response to determining that the deferred expiration time instant is invalid, said one or more processors discarding the deferred expiration time instant.

8. The method of claim 7, wherein the service has subservices, and wherein determining validity of the deferred expiration time instant comprises:
   determining whether an identification of a token included in a service access request send by a user is different from an identification of the token; and
   determining whether a number of times for which the deferred expiration time instant has been generated mismatches a position of one subservice of the subservices in an execution sequence of all of the subservices.

9. A computer program product, comprising one or more computer readable hardware storage devices having computer readable program code stored therein, said program code containing instructions executable by one or more processors of a computer system to implement a method, said method comprising:
   said one or more processors determining an expiration time instant of a token for accessing a service;
   said one or more processors determining accessibility of the service based on the expiration time instant of the token, wherein determining accessibility of the service comprises:
      determining whether the service has a subservice based on the access information;
      in response to determining that the service has a subservice, comparing a starting time instant at which the subservice starts with the expiration time instant of the token; a
      in response to determining that the starting time instant is later than the expiration time instant of the token, determining that the service is inaccessible; and
   in response to determining that the service is inaccessible, said one or more processors determining a deferred expiration time instant of the token based on access information about the service.

10. The computer program product of claim 9, wherein determining a deferred expiration time instant of the token comprises:
   determining whether the deferred expiration time instant of the token exists; and
   in response to determining that the deferred expiration time instant does not exist, generating the deferred expiration time instant of the token based on the access information.

11. The computer program product of claim 9, wherein determining a deferred expiration time instant of the token comprises: determining whether the deferred expiration time instant of the token exists; and in response to determining that the deferred expiration time instant does not exist, generating the deferred expiration time instant of the token based on the starting time instant.

12. The computer program product of claim 9, wherein the access information is historical access information about the service.

13. The computer program product of claim 9, wherein the access information indicates:
- an execution duration of the service; and/or
- an execution duration of a subservice of the service.

14. A computer system, comprising one or more processors, one or more memories, and one or more computer readable hardware storage devices, said one or more hardware storage device containing program code executable by the one or more processors via the one or more memories to implement a method, said method comprising:
- said one or more processors determining an expiration time instant of a token for accessing a service;
- said one or more processors determining accessibility of the service based on the expiration time instant of the token, wherein determining accessibility of the service comprises:
  - determining whether the service has a subservice based on the access information;
  - in response to determining that the service has a subservice, comparing a starting time instant at which the subservice starts with the expiration time instant of the token; a
  - in response to determining that the starting time instant is later than the expiration time instant of the token, determining that the service is inaccessible; and
  - in response to determining that the service is inaccessible, said one or more processors determining a deferred expiration time instant of the token based on access information about the service.

15. The computer system of claim 14, wherein determining a deferred expiration time instant of the token comprises:
- determining whether the deferred expiration time instant of the token exists; and
- in response to determining that the deferred expiration time instant does not exist, generating the deferred expiration time instant of the token based on the access information.

16. The computer system of claim 14, wherein determining a deferred expiration time instant of the token comprises: determining whether the deferred expiration time instant of the token exists; and in response to determining that the deferred expiration time instant does not exist, generating the deferred expiration time instant of the token based on the starting time instant.

17. The computer system of claim 14, wherein the access information is historical access information about the service.

* * * * *